(12) United States Patent
Ward et al.

(10) Patent No.: US 12,234,010 B2
(45) Date of Patent: Feb. 25, 2025

(54) SYSTEM AND METHOD FOR LOW SPEED WIND ESTIMATION IN VTOL AIRCRAFT

(71) Applicant: Lockheed Martin Corporation, Bethesda, MD (US)

(72) Inventors: Mark Daniel Ward, Milford, CT (US); Navid Dadkhah Tehrani, Providence, RI (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 719 days.

(21) Appl. No.: 17/494,236

(22) Filed: Oct. 5, 2021

(65) Prior Publication Data
US 2023/0103615 A1 Apr. 6, 2023

(51) Int. Cl.
*B64C 27/57* (2006.01)
*B64C 27/06* (2006.01)
*B64D 47/08* (2006.01)
*G01S 17/95* (2006.01)

(52) U.S. Cl.
CPC .............. *B64C 27/57* (2013.01); *B64D 47/08* (2013.01); *G01S 17/95* (2013.01); *B64C 27/06* (2013.01)

(58) Field of Classification Search
CPC ......... B64C 27/57; B64C 27/06; B64C 27/00; B64D 47/08; B64D 43/02; G01S 17/95; Y02A 90/10; G01P 5/06; G01P 5/26; G01P 5/00; G01P 13/025
See application file for complete search history.

(56) References Cited

U.S. PATENT DOCUMENTS

| | | | |
|---|---|---|---|
| 2,517,509 A * | 8/1950 | Sikorsky | B64C 25/54 123/41.11 |
| 4,887,087 A | 12/1989 | Clearwater | |
| 7,898,435 B2 | 3/2011 | Rogers et al. | |
| 9,759,809 B2 | 9/2017 | Derenick et al. | |
| 10,109,208 B2 | 10/2018 | Cherepinsky et al. | |
| 10,317,533 B2 | 6/2019 | Cherepinsky et al. | |
| 10,689,122 B2 | 6/2020 | Loussides et al. | |
| 2010/0230546 A1 * | 9/2010 | Bevirt | F03D 5/00 244/175 |
| 2013/0325218 A1 | 12/2013 | Spoldi | |

(Continued)

OTHER PUBLICATIONS

Bauknecht et al., "Three-Dimensional Reconstruction of Helicopter Blade-Tip Vortices Using a Multi-Camera BOS System", Experiments in Fluids, Dec. 9, 2014, vol. 56, No. 1, (13 pages).

(Continued)

*Primary Examiner* — Russell Frejd
(74) *Attorney, Agent, or Firm* — Foley & Lardner LLP (57) ABSTRACT

A wind estimation system for an aircraft includes a first sensor configured to sense a first position associated with an aircraft control component in a wind condition, a second sensor configured to sense a first configuration associated with a rotor system of the aircraft in the wind condition, and at least one controller in communication with at least one of the first sensor or the second sensor. The at least one controller is configured to determine a tip-path-plane angle of the aircraft based on the first position and the first configuration, and determine at least one of a current wind speed or current wind direction based on the tip-path-plane angle.

20 Claims, 5 Drawing Sheets

(56) References Cited

U.S. PATENT DOCUMENTS

| | | | |
|---|---|---|---|
| 2014/0046510 A1* | 2/2014 | Randolph | G01P 13/045 |
| | | | 701/14 |
| 2016/0023776 A1* | 1/2016 | Ganguli | G01P 5/02 |
| | | | 701/14 |
| 2017/0283049 A1* | 10/2017 | Weiner | B64C 27/80 |
| 2018/0339768 A1 | 11/2018 | Wang | |
| 2021/0132103 A1 | 5/2021 | Petillon | |
| 2021/0362846 A1* | 11/2021 | Petillon | G01C 19/065 |

OTHER PUBLICATIONS

Extended European Search Report on European Patent Application No. 22197345.6 dated Feb. 13, 2023 (18 pages).

* cited by examiner

SYSTEM AND METHOD FOR LOW SPEED WIND ESTIMATION IN VTOL AIRCRAFT

FIELD

The present disclosure relates generally to the field of vertical take-off and landing (VTOL) aircraft. More specifically, the present disclosure relates to a wind estimation system for a VTOL aircraft.

BACKGROUND

Generally, an amount of power required by various VTOL aircraft is reduced when hovering in a headwind condition. The power reduction may be affected by various factors including wind line. Inability to determine wind line (e.g., wind magnitude and direction) can impair aircraft landing attempts.

SUMMARY

One aspect of the present disclosure relates to a wind estimation system for an aircraft. The wind estimation system includes a first sensor configured to sense a first position associated with an aircraft control component in a wind condition, a second sensor configured to sense a first configuration associated with a rotor system of the aircraft in the wind condition, at least one controller in communication with each of the first sensor or the second sensor. The at least one controller is configured to determine a tip-path-plane angle of the aircraft based on the first position and the first configuration, and determine at least one of a current wind speed or a current wind direction based on the tip-path-plane angle.

In various embodiments, the aircraft control component is selected from the list consisting of: a pitch control, a throttle control, an antitorque control, and a cyclic pitch control. In some embodiments, the wind estimation system further includes a third sensor configured to sense a global position of the aircraft in the wind condition, and wherein determining the tip-path-plane angle of the aircraft is further based on the global position. In other embodiments, at least of the second sensor or the third sensor is a spatial sensor. In yet other embodiments, one of the second sensor or the third sensor is a camera. In some embodiments, at least one of the second sensor or the third sensor respectively determine the first configuration or the global position using light detection and ranging (LIDAR).

In various embodiments, the first configuration comprises at least one of an angle of attack or a blade pitch. In some embodiments, determining the current wind speed includes comparing at least one of the first position or the first configuration respectively with a second position or a second configuration and estimating at least one of the current wind speed or current wind direction based on at least one of a reference wind speed or reference wind direction. The second position or second configuration is associated with at least one of the reference wind speed or the reference wind direction. In other embodiments, the wind estimation system further includes a database communicably coupled to the at least one controller, wherein at least one of the second position, second configuration, or reference wind speed are determined from the database. In yet other embodiments, the database includes a reference table.

Another aspect of the present disclosure relates to a method for calculating a wind speed. The method includes sensing, by a first sensor, a first position associated with an aircraft control component in a wind condition, sensing, by a second sensor, a first configuration associated with a rotor system of an aircraft in the wind condition, and sensing, by a third sensor, a global position of the aircraft. The method further includes determining, by a controller in communication with each of the first sensor, second sensor, and third sensor, a tip-path-plane angle of the aircraft based on the first position, the first configuration, and the global position, and determining, by the controller, a current wind speed based on the tip-path-plane angle.

In various embodiments, the method further includes sensing, by the first sensor, a reference position associated with the aircraft control component in the wind condition, sensing, by the second sensor, a reference configuration associated with the rotor system in the wind condition, sensing, by the third sensor, a reference position of the aircraft, and determining, by the controller, a reference tip-path-plane angle. In some embodiments, determining the current wind speed includes comparing at least one of the first position or the first configuration respectively with the reference position or the reference configuration, the reference position or reference configuration being associated with a reference wind speed, and estimating the current wind speed based on the reference wind speed.

In various embodiments, the method further includes storing, by a memory in communication with the controller, each of the reference position, the reference configuration, and the reference position in a database communicably coupled to the controller. In some embodiments, the database includes a look up table. In other embodiments, each of the reference wind speed is approximately 40 knots or less. In yet other embodiments, determining the tip-path-plane angle includes implementing a random sample consensus (RANSAC) algorithm.

Yet another aspect of the present disclosure relates to an aircraft. The aircraft includes a rotor system, at least one control component in communication with the rotor system, a first sensor configured to sense a first position associated with the at least one control component a wind condition, a second sensor configured to sense a first configuration associated with the rotor system in the wind condition, a global position determination system comprising a third sensor configured to sense a global position of the aircraft in the wind condition, and at least one controller in communication with each of the first sensor, the second sensor, and the third sensor. The at least one processor is configured to determine a tip-path-plane angle of the aircraft based on the first position, the first configuration, and the global position, and determine a current wind speed based on the tip-path-plane angle.

In various embodiments, the aircraft is at least one of a semiautonomous or autonomous vertical take-off and landing aircraft. In some embodiments, at least one of the second sensor or the third sensor is mounted to an airframe portion of the aircraft.

This summary is illustrative only and should not be regarded as limiting.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are contemplated and made part of this disclosure.

Estimation of wind direction and magnitude can be performed in flight using a global position system (GPS) and/or an inertial measurement unit (IMU), and airspeed measurement equipment via pitot tubes. Pitot tubes measure pressure differences to calculate the airspeed of the aircraft. Although pitot tubes are sufficient in many circumstances (e.g., for fixed-wing aircraft), pitot tubes cannot provide accurate information in all circumstances—such as in use with helicopters, since helicopters may hover or operate at low airspeed regimes. The insufficiency of pitot tubes in determining wind speed and direction in the case of helicopters is because when helicopters move slowly or hover, the downwash from the rotor interferes with pitot tubes measurements. In hover and low speed operations, a helicopter pilot is then forced to use visual cues to estimate the direction and magnitude of the wind in their local operating environment using alternative methods (e.g., wind socks, flags, trees, etc.), which are not very accurate and are not always feasible to use. Knowing the direction and magnitude of wind is very important, and hovering into wind is a generally accepted safety practice. For example, in the event of an engine failure, a standard technique is to land the aircraft with minimal drift or yawing motion. This landing approach requires rapid but smooth application of aircraft controls, and performance of this maneuver is greatly improved when performed into the wind. Accordingly, for autonomous and semi-autonomous VTOL applications, knowledge of the accurate wind line (e.g., speed and direction) at low speed is important.

The approach in the present disclosure is directed to and intended for applications involving low airspeeds where aircraft pitot tubes (or similar mechanisms) cannot provide accurate information. However, even at higher airspeeds, the approach disclosed herein can be utilized as a secondary option (i.e., an alternative to pitot tubes or other similar mechanisms) to obtain wind magnitude and direction during flight.

Figure 1:
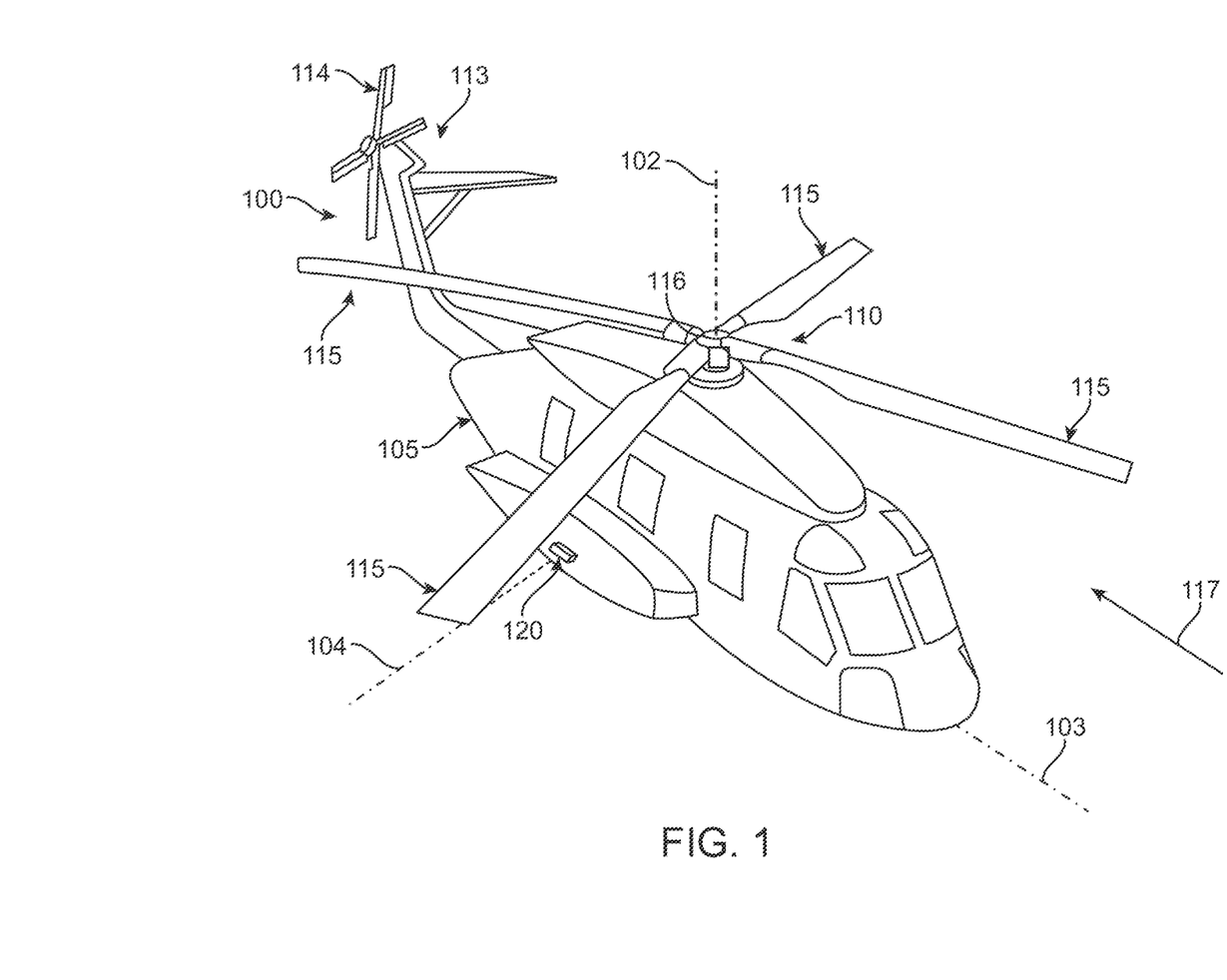
FIG. 1 is a schematic representation of a perspective view of an aircraft having a wind estimation system, according to an exemplary embodiment.
Figure 2:
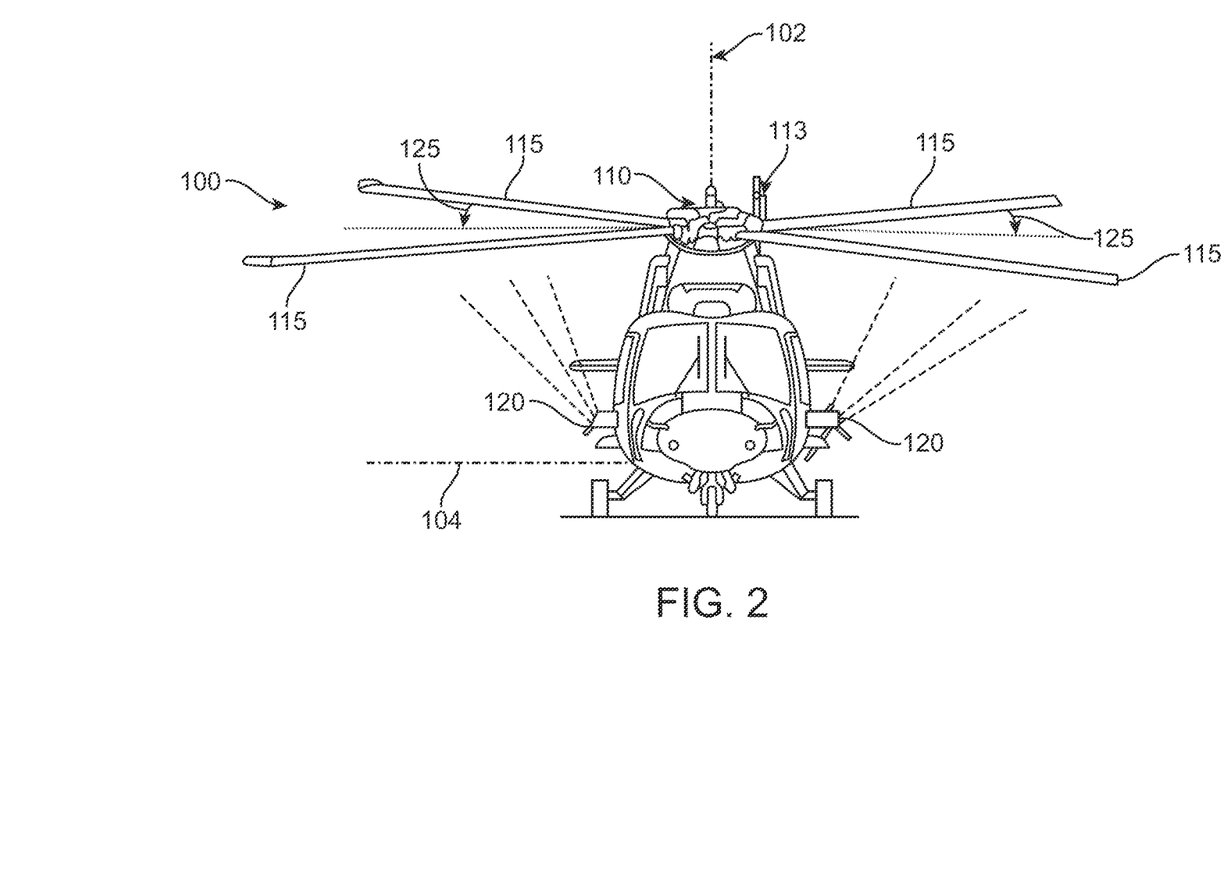
FIG. 2 is a schematic representation of a front view of the aircraft of FIG. 1, according to an exemplary embodiment.

Referring to FIGS. 1 and 2, schematic representations of perspective and front views of an aircraft 100 are shown. The aircraft 100 has a global position within a three dimensional space generally defined by a first axis 102, a second axis 103, and a third axis 104, wherein each of the first, second, and third axes 102, 103, 104 are mutually perpendicular. The aircraft 100, which is configured for vertical take-off and landing (VTOL), includes an airframe 105 having a main blade rotor system 110 and a tail rotor system 113 to facilitate flight in one or more wind conditions 117. In various embodiments, the aircraft 100 may be autonomous or semiautonomous. The one or more wind conditions 117 ("wind line") includes or is defined by at least one of a wind magnitude or a wind direction.

As shown, the main rotor system 110 includes blades 115, and the tail rotor system 113 includes blades 114. In various embodiments, the main rotor system 110 includes a main rotor hub assembly 116, which is configured to drive rotation of each of the blades 115. The main rotor hub assembly may include a drive shaft, a main bearing, a plurality of pitch links and pitch bearings corresponding to each of the blades 115. The aircraft 100 also includes one or more sensors 120 coupled to an exterior portion of the airframe 105. As shown, the one or more sensors 120 may be mounted on opposing sides of the airframe 105. In various embodiments, the one or more sensors 120 are adapted to sense a configuration of one or more structural components of the aircraft 100 during flight. In various embodiments, the one or more sensors 120 may be sensors configured for light detection and ranging (LIDAR). In some embodiments, the one or more sensors 120 may be or include a camera.

In various embodiments, the configuration of the one or more structural components may include, but are not limited to, a configuration of at least one of the main blade rotor system 110 or the tail rotor system 113. The configuration may include or be characterized by at least one of an angle of attack, blade pitch (i.e., pitch of the blades 114, 115), or a rotor disk position (i.e., position of the rotor disk formed by at main rotor system 110 and/or tail rotor system 113). Determination of the configuration of the main blade rotor system 110 and/or the tail rotor system 113 can be subsequently used to determine a tip-path-plane angle 125 of the main rotor system 110.

Figure 3:
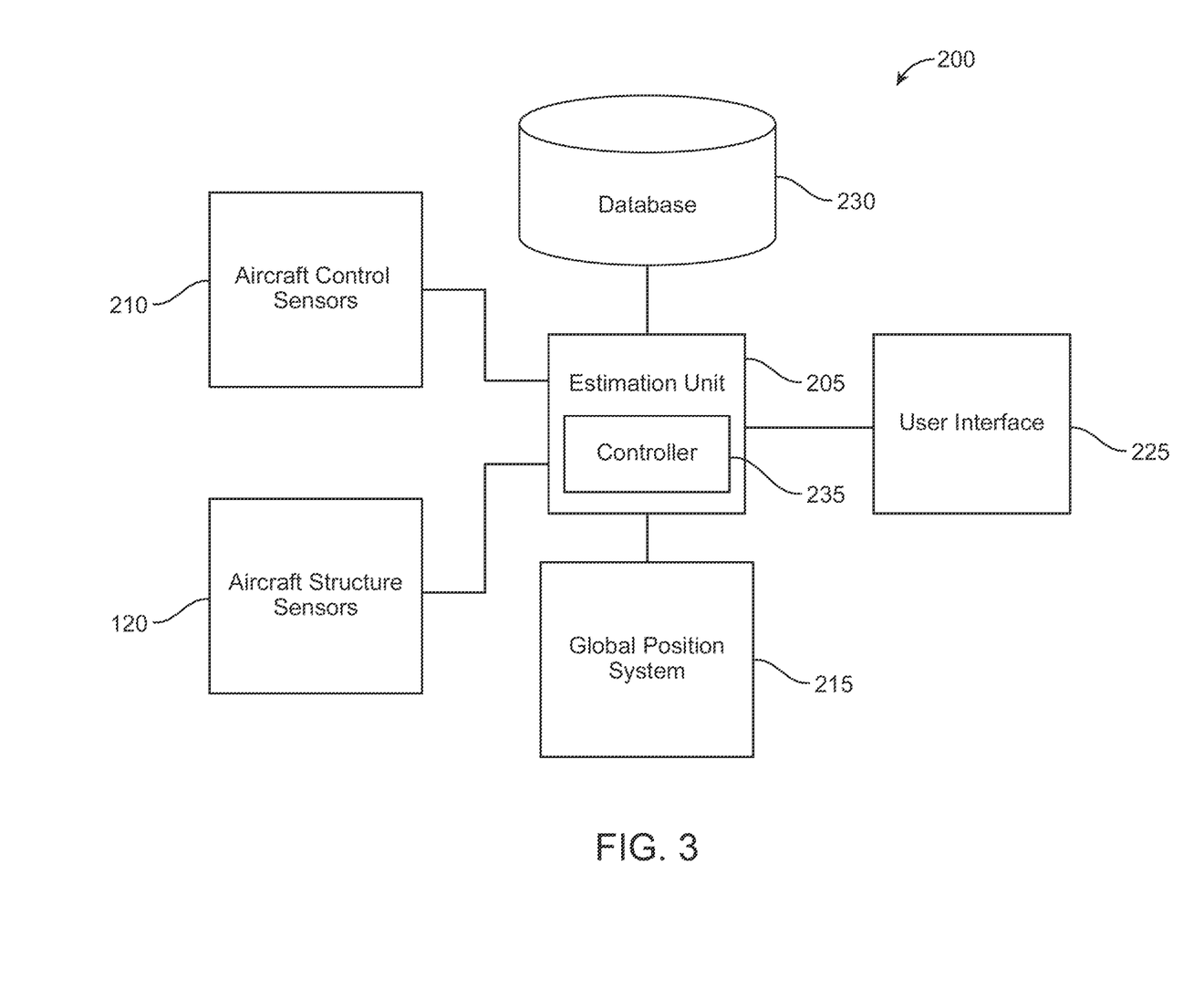
FIG. 3 is a schematic representation of the wind estimation system contained in the aircraft of FIG. 1, according to an exemplary embodiment.

The aircraft 100 also includes a wind estimation system 200, a schematic representation of which is shown in FIG. 3. The wind estimation system 200 is configured to determine the wind condition 117 acting on the aircraft 100. As shown, the wind estimation system 200 includes an estimation unit 205, which includes at least one controller 235 configured to receive input from the one or more sensors 120 ("aircraft structure sensors"), one or more sensors 210 ("aircraft control sensors"), a global positioning system 215 ("global positioning system 215"), and a database 230. The at least one controller 235 of the estimation unit 205 may be a non-transitory computer readable medium or processor, having computer-readable instructions stored thereon that, when executed, cause the at least one controller to carry out operations called for by the instructions. The at least one controller 235 of the estimation unit 205 may be provided with a power source, a memory, a communications interface, and a processor. In various embodiments, the at least one controller 235 of the estimation unit 205 may be a computing device. In other embodiments, the at least one controller 235 may be configured as part of a data cloud computing system configured to receive commands from a user control device and/or a remote computing device. In other embodiments, the at least one controller 235 of the estimation unit 205 may include fewer, additional and/or different components.

The one or more sensors 210 are configured to sense a position and/or setting of one or more aircraft controls disposed within the airframe 105 (e.g., within the cockpit). Such aircraft controls may include, but are not limited to a collective pitch control, a throttle control, an antitorque control, and a cyclic pitch control. For example, the one or more sensors 210 may be configured to sense a particular position or configuration of one or more pedals, levers, knobs, or other components associated with the aircraft controls. In various embodiments, the global positioning system may include one or more sensors configured to determine a spatial position of the aircraft 100 relative to a ground surface. In various embodiments, the one or more sensors 210 may be communicatively coupled to or included within a health and usage monitoring system (HUMS) contained within the aircraft 100.

In various embodiments, the global position system 215 may include one or more sensors or receivers for detecting a position of the aircraft 100 during flight. The one or more sensors within the global position system 215 may include, but are not limited to, one or more Doppler velocity sensors, global positioning (GPS) receivers configured to receiver one or more signals from one or more navigation satellites, or any other sensors known in the art to facilitate position detection and determination in an aircraft. In various embodiments, the one or more sensors or receivers of the global position system 215 may be mounted to an exterior portion of the aircraft 100, such as, for example, mounted to the airframe 105.

During operation of the aircraft 100, the estimation unit 205 is configured to receive outputs from each of the one or more sensors 120, the one or more sensors 210, and the global position system 215. Outputs from the one or more sensors 120 include, but are not limited to, one or more configurations of one or more structural components of the aircraft, which are associated with at least one of the angle of attack, blade pitch (i.e., pitch of the blades 114, 115), or the rotor disk position (i.e., position of the rotor disk formed by at main rotor system 110 and/or tail rotor system 113). Outputs from the one or more sensors 120 may further include the tip-path-plane angle 125 of the main rotor system 110. Outputs from the one or more sensors 210 include, but are not limited to, a position and/or setting of one or more aircraft controls, which may be associated with at least one of the collective pitch control, the throttle control, the antitorque control, or the cyclic pitch control.

Upon receiving outputs from each of the one or more sensors 120, 210, the estimation unit 205 is configured to store said outputs within the database 230, which is communicatively coupled to the estimation unit 205. The database 230 is further configured to store global position information from the global position system 215. In various embodiments, the database 230 may be located on the aircraft 100, remotely located and wirelessly in communication, or as part of a data cloud computing system. In various embodiments, the database 230 may be a look-up or reference table.

Upon receipt of outputs from each of the one or more sensors, 120, 210, and from the global position system 215, the estimation unit 205 determines the tip-path-plane angle 125. Using the tip-path-plane angle 125, along with the outputs from the one or more sensors 120, the estimation unit 205 will determine the wind condition 117, which may include the wind magnitude and direction. In various embodiments, the estimation unit 205 will subsequently store the determined wind condition 117 and the outputs associated with the wind condition 117 (i.e., the outputs from the one or more sensors 120, 210 and/or the outputs from the global position system 215) in the database 230. The estimation unit 205 may then output the determined wind condition 117 to a user interface 225, which is communicatively coupled to the estimation unit 205. The estimation unit 205 may additionally output the information sensed by the one or more sensors 120, 210 to the user interface 225. In various embodiments, the user interface 225 may be a graphical interface. In some embodiments, the user interface 225 may include one or more components configured to be responsive to user input such as, but not limited to, one or more touch-sensitive regions, buttons, microphones, levers, or knobs. In various embodiments, the estimation unit 205 may be configured to determine the wind condition 117 responsive to an input from the user interface 225.

In various embodiments, determination of the wind condition 117 is based on rotor flapping dynamics and tip-path-plane 125 dynamics. In various implementations, determination of variables specific to the aircraft 100 facilitate determination of wind directions, and thus, the wind condition 117. Equations 1 and 2, as provided below, illustrate the mathematical relationship between wind condition 117 components and the rotor flapping and tip-path-plane 125 dynamics.

$$\dot{b}_1 = -p - \frac{b_1}{\tau_e} - \frac{1}{\tau_e}\frac{\partial b_1}{\partial \mu_v}\frac{v - v_w}{\Omega R} + \frac{B_{\delta_{lat}}}{\tau_e}\delta_{lat} \quad \text{(Equation 1)}$$

$$\dot{a}_1 = -q - \frac{a_1}{\tau_e} + \frac{1}{\tau_e}\left(\frac{\partial a_1}{\partial \mu}\frac{u - u_w}{\Omega R} + \frac{\partial a_1}{\partial \mu_z}\frac{w - w_w}{\Omega R}\right) + \frac{A_{\delta_{lon}}}{\tau_e}\delta_{lon} \quad \text{(Equation 2)}$$

As shown above in Equations 1 and 2, in various implementations, the first derivatives of the lateral and longitudinal flapping angles, $\dot{b}_1$ and $\dot{a}_1$, respectively, are mathematically related to the lateral and longitudinal body angular rates, p and q, respectively, in addition to the lateral and longitudinal flapping pilot cyclic inputs (e.g., as determined by aircraft control sensors 210), $\delta_{lat}$ and $\delta_{lon}$, respectively. In various embodiments, the pilot cyclic inputs, $\delta_{lat}$ and $\delta_{lon}$, may include a control position (e.g., a position of a joystick, actuator, lever, button, throttle or pedal position, etc.). The first derivatives of the flapping angles, $\dot{b}_1$ and $\dot{a}_1$, (and thus the flapping angles $b_1$ and $a_1$) are also affected by the radius, R, of the main rotor blades 115, the nominal rotational speed, $\Omega 2$, of the main rotor 110, an effective main rotor 110 time constant, $\tau_e$, and gains from cyclic inputs to the main rotor 110 (i.e., $A_{lat}$, $B_{lat}$). The first derivatives of the flapping angles, $\dot{b}_1$ and $\dot{a}_1$, (and the flapping angles $b_1$ and $a_1$) are also related to the aircraft 100 velocity components in three perpendicular directions, u, v, w, and wind velocity components in three perpendicular directions, $u_w$, $v_w$, $w_w$, along with an advance ratio and normalized inflow, which relate the wind velocity components to the rotational speed, $\Omega$, and the blade 115 radius, R. The advance ratio is provided below as Equation 3 and the normalized inflow is provided as Equation 4. The flapping angles $b_1$ and $a_1$, are thus determined (via the first derivatives $\dot{b}_1$ and $\dot{a}_1$) as a function of the wind velocities, $u_w$, $v_w$, $w_w$, and various control inputs, including the pilot cycling inputs, $\delta_{lat}$ and $\delta_{lon}$.

$$\mu = \frac{\sqrt{(u - u_w)^2 + (v - v_w)^2}}{\Omega R} \quad \text{(Equation 3)}$$

$$\mu_v = \frac{w - w_w}{\Omega R} \quad \text{(Equation 4)}$$

In equations 1-4, the aircraft 100 velocity components, u, v, and w, (i.e., ground speed) may be measured by the global positioning system 215. The control inputs, $\delta_{lat}$ and $\delta_{lon}$, may be measured by the aircraft control sensors 210. As described above, the aircraft 100 includes one or more sensors 120 configured to determine the tip-path-plane angles 125, which include the flapping angles, $b_1$ and $a_1$, using, for example, a detection technology including but not limited to LIDAR. The wind velocity components, $u_w$, $v_w$, $w_w$, are defined in three perpendicular directions with respect to the aircraft 100. However, to determine the wind velocity components relative to an inertial frame of reference, which is necessary to determine the wind condition 117, Equations 1-4 can be first rearranged to solve for the wind velocity components, $u_w$, $v_w$, $w_w$, relative to the aircraft 100. Then, the wind velocity components relative to the aircraft 100 can be subsequently converted to wind velocity relative to the inertial frame of reference using aircraft pitch and/or roll (i.e., as determined by at least one of the aircraft global position system 215 or an inertial navigation system) to determine the wind condition 117. Thus, by determining the tip-path-plane angles 125 and the flapping angles, $b_1$ and $a_1$, using, e.g., LIDAR (i.e., via the one or more sensors 120), along with the control inputs, $\delta_{lat}$ and $\delta_{lon}$, the wind velocity components can be calculated to determine the wind condition 117.

Figure 4:
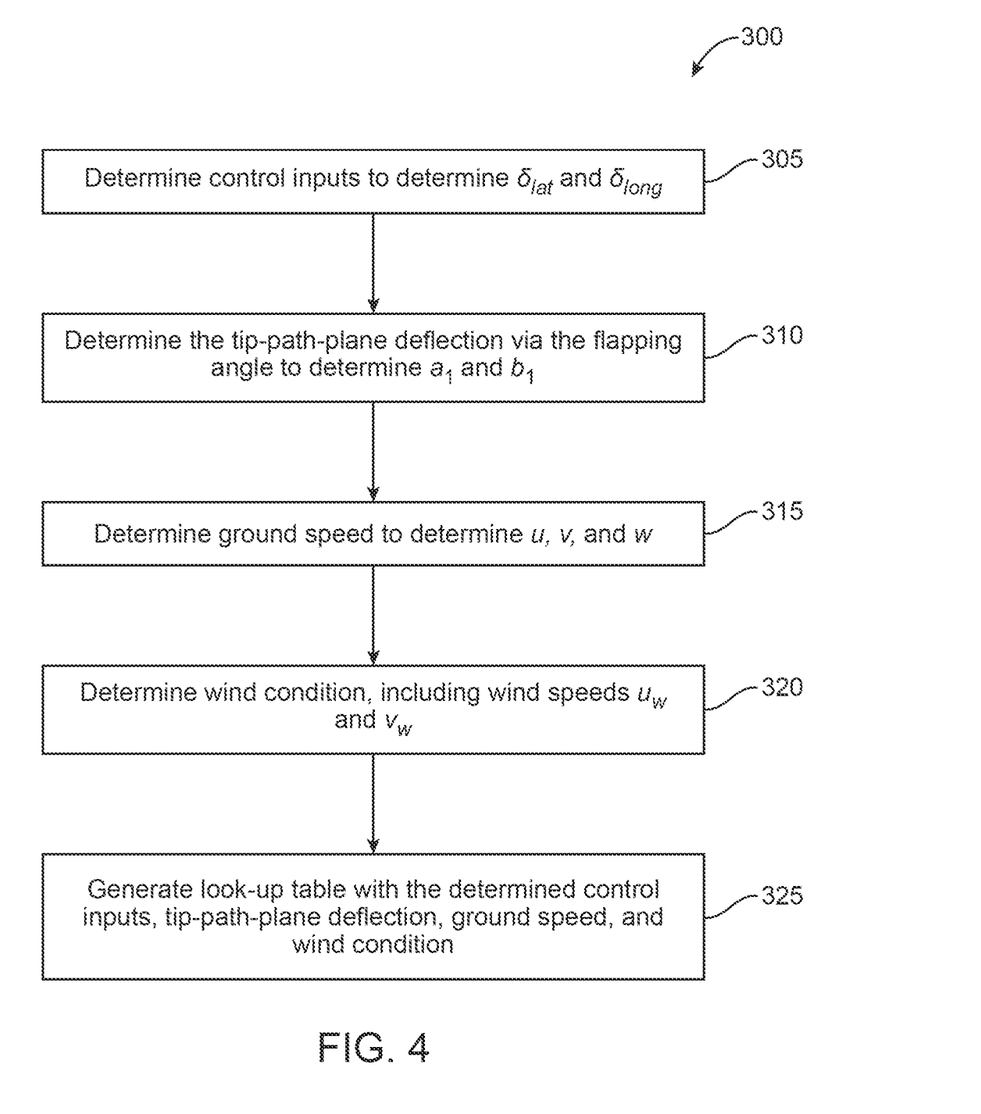
FIG. 4 is a schematic representation of a method of generating a look-up table to be used by the wind estimation system of FIG. 3, according to an exemplary embodiment.

FIG. 4 shows a method 300, which is implemented to generate a look-up table to be used by the wind estimation system 200 in determining the wind condition 117. In various embodiments, the aircraft 100 may be operated in a controlled environment (e.g., simulator) where control inputs, structural component configurations, and ground speed of the aircraft 100 can be measured and recorded, and where the wind condition 117 is known. In other embodiments, the aircraft 100 operation may be virtually simulated using one or more computer-simulated environments. Accordingly, each of the control inputs, component configurations (e.g., tip-path-plane angles 125), and ground speed can be recorded at different, known wind conditions 117 to generate a look-up table, which can be saved in the database 230 and later used by the wind estimation unit 205 within the wind estimation system 200.

In a first operation 305, a position, setting, or configuration of one or more controls within the aircraft 100 is determined and recorded during a controlled simulation (e.g., a known wind condition). In various embodiments, the one or more controls may include at least one of a collective control, pitch control, a throttle control, an antitorque control, or a cyclic pitch control, which can then be used as the control inputs, $\delta_{lat}$ and $\delta_{lon}$, in Equations 1 and 2. In operation 310, a configuration of one or more structural components of the aircraft 100 is determined and recorded, where the configuration of the one or more structural components are associated with at least one of the angle of attack, blade pitch, the rotor disk position, or the tip-path-plane angle 125. For example, the flapping angles, $b_1$ and $a_1$, can be recorded to determine the tip-path-plane angle 125. Subsequently or concurrently, in an operation 315, the velocity of the aircraft 100 (e.g., ground speed), u, v, and w, are determined and recorded. In a subsequent or concurrent operation 320, the wind condition 117 is also determined and recorded. The wind condition 117 may include at least one of the wind magnitude or wind direction, and including the wind velocity components, $u_w$, $v_w$, $w_w$. To determine the wind condition 117, the wind velocity components may be converted from being defined relative to the aircraft 100 frame of reference to being defined relative to a global frame of reference. In various embodiments, each of the operations 305-320 may be carried out by the wind estimation system 200, where each of the control inputs, component configurations, and aircraft 100 velocity are determined by the controller 235 (e.g., by the sensors 120, 210, 215) and saved in the database 230. In various embodiments, each of the control inputs, component configurations, aircraft 100 velocity, and/or wind condition 117 may be externally measured (e.g., by one or more sensors external to the aircraft 100) and later saved to the database 230 in the lookup table, such as by communication with the controller 235 via the user interface 225.

In various embodiments, the wind estimation unit 205 may be configured to determine the wind condition 117 from known control inputs, ground speed, and tip-path-plane angle 125 by solving for the wind velocity components, $u_w$, $v_w$, $w_w$, (i.e., using Equations 1 and 2), which may be stored in a lookup table (i.e., within the database 230). Consequently, in subsequent iterations, the wind estimation unit 205 may determine the wind condition 117 by retrieving the stored wind velocity components (i.e., from the lookup table generated via the method 300 and stored in the database 230).

Figure 5:
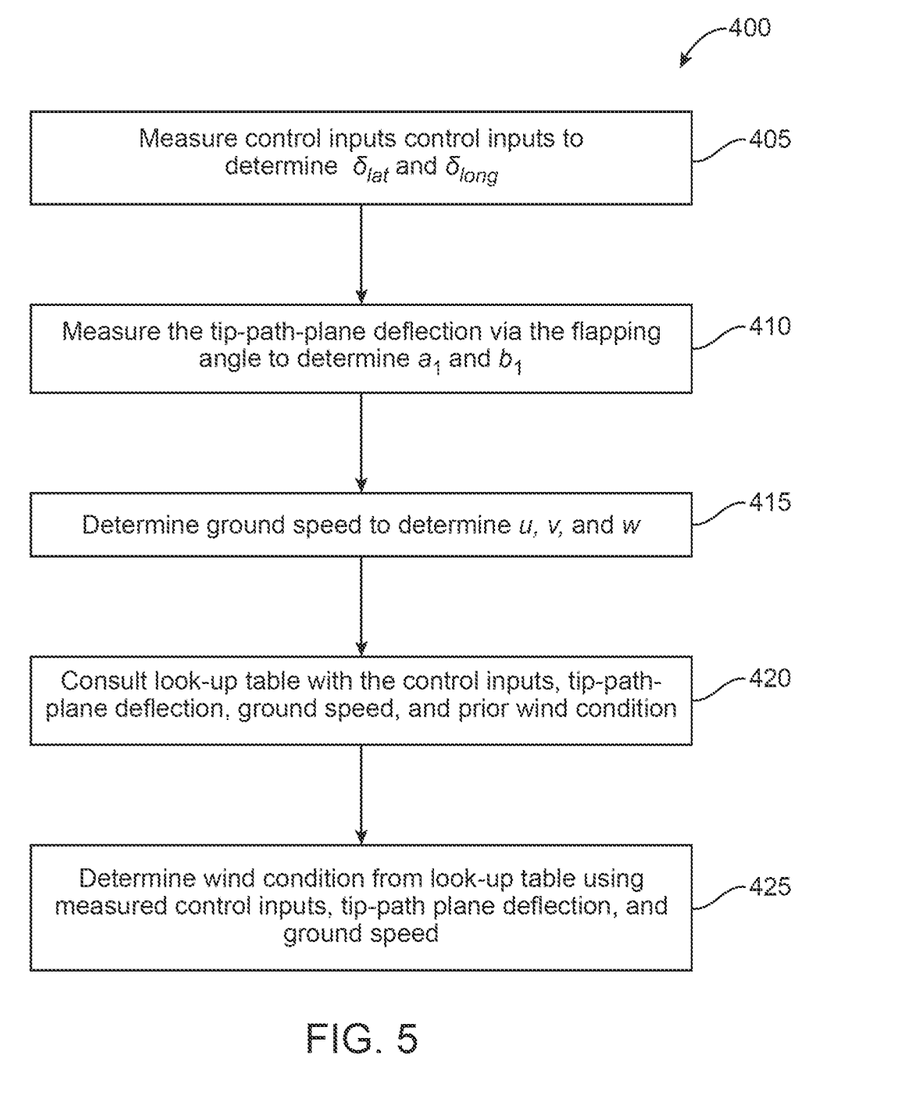
FIG. 5 is a schematic representation of a method employed by the wind estimation system of FIG. 3, according to an exemplary embodiment.

FIG. 5 shows a method 400, which is implemented by the wind estimation system 200 to determine an unknown wind condition 117 using a lookup table stored in the database 230, where the lookup table is based on one or more previously determined and stored wind conditions (e.g., as determined from the method 300). In an operation 405, the wind estimation system 200 may sense (e.g., via the sensors 210) a new control setting, which determine $\delta_{lat}$ and $\delta_{long}$. Alternatively, the control setting may be input or otherwise set using the user interface 225. In a subsequent or concurrent operation 410, the wind estimation system 200 may determine the tip-path-plane angle 125 by sensing the flapping angles, $a_1$ and $b_1$, of the rotor blades 115 using the sensors 120. In various embodiments, the flapping angles, $a_1$ and $b_1$, may be determined using LIDAR. In an operation 415, the velocity of the aircraft 100 (e.g., ground speed), u, v, and w, may be measured by the global position system 215.

In an operation 420, upon sensing the new information (i.e., the control inputs, component configuration, and ground speed) from the one or more sensors 120, 210 and global position system 215 in the operations 405-415, the estimation unit 205 may compare the new information from the one or more sensors 120, 210 and the global positon system 215 to the lookup table stored in the database 230. Specifically, the controller 235 within the wind estimation unit 205 may compare the new information obtained in operations 405-415 to corresponding reference information within the lookup table. The reference information includes at least one stored wind condition 117 ("reference wind condition" or "prior wind condition"), which is determined through the method 300, and is associated with a corresponding stored control position or control inputs ("reference position"), stored aircraft component configuration ("reference configuration"), and aircraft 100 velocity (e.g., ground speed). Finally, in an operation 425, the estimation unit 205 may then determine or estimate a new wind condition 117 (including at least one of a wind direction or a wind speed) based on the comparison of the new information sensed by the one or more sensors 120, 210 to the reference wind condition (and reference wind speed and/or reference wind direction), the reference position, and/or the reference configuration. In various embodiments, the new wind condition 117 may align or correspond with a reference wind condition. In other embodiments, the new wind condition 117 may be estimated based on one or more reference wind conditions. Upon determining the new wind condition 117, the wind estimation system 200 may then output the new wind condition 117 via the user interface 225.

In various embodiments, the database 230 may additionally or alternatively include stored wind conditions based on experimental data, flight simulations, and/or predetermined wind conditions preprogrammed by a user, which may be included in the lookup table. In some embodiments, the wind estimation system 200 may additionally or alternatively may include or be in communication with one or more neural networks, wherein the wind estimation system 200 is configured to determine the wind condition 117 using the one or more neural networks.

In various embodiments, the wind estimation unit 205 may be configured to use random sample consensus (RANSAC). Because various sensing mechanisms including LIDAR (i.e., to determine configurations of the aircraft 100 components, along with ground speed and position) generate many data points, the wind estimation unit 205 may receive the data points (i.e., at the controller 235) and implement one or more plane fitting algorithms (e.g., a random sample consensus (RANSAC) that performs iteration to construct a model from a dataset containing outliers) to remove outliers.

Notwithstanding the embodiments described above in reference to FIGS. 1-5, various modifications and inclusions to those embodiments are contemplated and considered within the scope of the present disclosure.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration.

In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Two or more steps may be performed concurrently or with partial concurrence, unless specified differently above.

It is important to note that any element disclosed in one embodiment may be incorporated or utilized with any other embodiment disclosed herein. The systems and methods described herein may be embodied in other specific forms without departing from the characteristics thereof. The foregoing implementations are illustrative rather than limiting of the described systems and methods. The scope of the systems and methods described herein is thus indicated by the appended claims, rather than the foregoing description, and changes that come within the meaning and range of equivalency of the claims are embraced therein.

What is claimed is:

1. A wind estimation system for an aircraft, the system comprising:
a first sensor configured to sense a first position associated with an aircraft control component in a wind condition;
a second sensor configured to sense a first configuration associated with a rotor system of the aircraft in the wind condition; and
at least one controller in communication with at least one of the first sensor or the second sensor, the at least one controller being configured to:
determine a tip-path-plane angle of the aircraft based on the first position and the first configuration;
determine at least one of a current wind speed or current wind direction associated with the wind condition based on the tip-path-plane angle; and
control the aircraft based on at least one of the current wind speed or the current wind direction.

2. The wind estimation system of claim 1, wherein the aircraft control component is selected from the list consisting of: a pitch control, a throttle control, an antitorque control, and a cyclic pitch control.

3. The wind estimation system of claim 1, further comprising a third sensor configured to sense a global position of the aircraft in the wind condition, wherein determining the tip-path-plane angle of the aircraft is further based on the global position.

4. The wind estimation system of claim 3, wherein at least one of the second sensor or the third sensor is a spatial sensor.

5. The wind estimation system of claim 3, wherein at least one of the second sensor or the third sensor is a camera.

6. The wind estimation system of claim 3, wherein at least one of the second sensor or the third sensor respectively determine the first configuration or the global position using light detection and ranging (LIDAR).

7. The wind estimation system of claim 1, wherein the first configuration comprises at least one of an angle of attack or a blade pitch.

8. The wind estimation system of claim 1, wherein the at least one controller is configured to determine the current wind speed by
comparing at least one of the first position or the first configuration respectively with a second position or a second configuration, the second position or second configuration being associated with at least one of a reference wind speed or a reference wind direction; and
estimating at least one of the current wind speed or current wind direction based on at least one of the reference wind speed or reference wind direction.

9. The wind estimation system of claim 8, further comprising a memory configured to store a database accessible to the at least one controller, wherein at least one of the second position, the second configuration, or the reference wind speed are determined from the database.

10. The wind estimation system of claim 8, wherein the at least one controller is configured to estimate the wind speed based on information from a reference table of the database and information from the first sensor.

11. A method for calculating a wind speed, the method comprising:
sensing, by a first sensor, a first position associated with an aircraft control component in a wind condition;
sensing, by a second sensor, a first configuration associated with a rotor system of an aircraft in the wind condition;
sensing, by a third sensor, a global position of the aircraft;
determining, by a controller in communication with each of the first sensor, second sensor, and third sensor, a tip-path-plane angle of the aircraft based on the first position, the first configuration, and the global position;
determining, by the controller, a current wind speed based on the tip-path-plane angle; and
controlling the aircraft based on the current wind speed.

12. The method of claim 11, further comprising:
sensing, by the first sensor, a reference position associated with the aircraft control component in the wind condition;
sensing, by the second sensor, a reference configuration associated with the rotor system in the wind condition;
sensing, by the third sensor, a reference position of the aircraft; and
determining, by the controller, a reference tip-path-plane angle.

13. The method of claim 12, wherein determining the current wind speed comprises:
comparing at least one of the first position or the first configuration respectively with the reference position or the reference configuration, the reference position or reference configuration being associated with a reference wind speed; and
estimating the current wind speed based on the reference wind speed.

14. The method of claim 12, further comprising storing, by a memory in communication with the controller, each of the reference configuration and the reference position in a database communicably coupled to the controller.

15. The method of claim 14, wherein the database comprises a look up table.

16. The method of claim 14, wherein the reference wind speed is approximately 40 knots or less.

17. The method of claim 11, wherein determining the tip-path-plane angle comprises implementing a random sample consensus (RANSAC) algorithm.

18. An aircraft comprising:
a rotor system;
at least one control component in communication with the rotor system;
a first sensor configured to sense a first position associated with the at least one control component in a wind condition;
a second sensor configured to sense a first configuration associated with the rotor system in the wind condition;
a global position determination system comprising a third sensor configured to sense a global position of the aircraft in the wind condition; and
at least one controller in communication with each of the first sensor, the second sensor, and the third sensor, the at least one processor being configured to:

determine a tip-path-plane angle of the aircraft based on the first position, the first configuration, and the global position;
determine a current wind speed based on the tip-path-plane angle; and
control the aircraft based on the current wind speed.

19. The aircraft of claim 18, wherein the aircraft is at least one of a semiautonomous or autonomous vertical take-off and landing aircraft.

20. The aircraft of claim 18, wherein at least one of the second sensor or the third sensor is mounted to an airframe portion of the aircraft.

\* \* \* \* \*